(12) United States Patent
Stevens

(10) Patent No.: US 10,729,115 B2
(45) Date of Patent: Aug. 4, 2020

(54) BEDBUG TRAP WITH CARBON DIOXIDE GENERATOR

(71) Applicant: Paul Stevens, Anchorage, AK (US)

(72) Inventor: Paul Stevens, Anchorage, AK (US)

(73) Assignee: TUGBUG LLC, Scottsdale, AZ (US)

( * ) Notice: Subject to any disclaimer, the term of this patent is extended or adjusted under 35 U.S.C. 154(b) by 290 days.

(21) Appl. No.: 15/594,931

(22) Filed: May 15, 2017

(65) Prior Publication Data

US 2020/0100489 A1     Apr. 2, 2020

(51) Int. Cl.
| | |
|---|---|
| *A01M 1/02* | (2006.01) |
| *A01M 1/10* | (2006.01) |
| *A01M 1/12* | (2006.01) |
| *A01N 25/18* | (2006.01) |
| *A01N 63/10* | (2020.01) |
| *A01N 25/12* | (2006.01) |
| *A01N 59/00* | (2006.01) |

(52) U.S. Cl.
CPC ............ *A01M 1/023* (2013.01); *A01M 1/103* (2013.01); *A01N 25/18* (2013.01); *A01N 63/10* (2020.01); *A01M 1/02* (2013.01); *A01M 1/10* (2013.01); *A01M 2200/01* (2013.01); *A01M 2200/011* (2013.01); *A01N 25/12* (2013.01); *A01N 59/00* (2013.01)

(58) Field of Classification Search
CPC .......... A01M 1/00; A01M 1/02; A01M 1/023; A01M 1/10; A01M 1/103; A01M 1/20; A01M 1/2005; A01M 1/2011
USPC ......................... 43/121, 123, 131, 107, 132.1
See application file for complete search history.

(56) References Cited

U.S. PATENT DOCUMENTS

| | | | | |
|---|---|---|---|---|
| 4,608,774 A | * | 9/1986 | Sherman ................. | A01M 1/02 43/114 |
| 5,189,830 A | * | 3/1993 | Montemurro ......... | A01M 1/023 43/121 |

(Continued)

FOREIGN PATENT DOCUMENTS

WO     WO-2018213028 A1 * 11/2018 ............. A01N 59/04

OTHER PUBLICATIONS

CO2 Bedbug Trap—Making Traps—How to Get Rid of Bedbugs Yourself, Publish Date: Nov. 11, 2013, http://howtogetridofbedbugsyourself.com/2013/11/11/co2-bedbug-trap-making-traps/ (last visited on Apr. 15, 2019) (Year: 2013).*

*Primary Examiner* — Darren W Ark
(74) *Attorney, Agent, or Firm* — Bycer Law, PLC; Matthew L. Bycer

(57) ABSTRACT

A bedbug trap that has a series of stacked containers. The top container holds a quantity of water, sugar and yeast, which generates carbon dioxide. The central container holds a small heating pad to attract the bedbugs and to heat the water and yeast mixture to aid in the fermentation. A hose with a water trap system brings the generated carbon dioxide from the upper chamber to the bottom chamber. This chamber sits in a bowl that has a rough exterior and a smooth interior. Holes, formed around the base of the bottom chamber allow the carbon dioxide to escape into the room, which attracts the bedbugs. The assembled unit is large, to trap as many bedbugs as possible in the shortest amount of time. Finally, the water, sugar and yeast are common household items that are easily and cheaply replenished as needed.

17 Claims, 5 Drawing Sheets

(56) References Cited

U.S. PATENT DOCUMENTS

| | | | | |
|---|---|---|---|---|
| 5,327,675 A * | 7/1994 | Butler | A01M 1/02 | 43/113 |
| 6,055,766 A * | 5/2000 | Nolen | A01M 1/023 | 43/112 |
| 6,425,202 B1 * | 7/2002 | Lin | A01M 1/2016 | 43/107 |
| 6,508,032 B2 * | 1/2003 | Lin | A01M 1/14 | 43/107 |
| 6,655,080 B2 * | 12/2003 | Spiro | A01M 1/023 | 43/107 |
| 6,662,489 B2 * | 12/2003 | Spiro | A01M 1/023 | 43/107 |
| 6,898,896 B1 * | 5/2005 | McBride | A01M 1/023 | 43/107 |
| 6,920,716 B2 * | 7/2005 | Kollars, Jr. | A01M 1/023 | 43/107 |
| 7,181,885 B2 * | 2/2007 | Spiro | A01M 1/023 | 43/139 |
| 7,234,268 B2 * | 6/2007 | Welch | A01M 1/02 | 43/112 |
| 7,614,180 B2 * | 11/2009 | Durand | A01M 1/06 | 43/139 |
| 7,757,431 B2 * | 7/2010 | Welch | A01M 1/02 | 43/112 |
| 7,988,984 B2 * | 8/2011 | Hockaday | A01M 29/10 | 424/403 |
| 8,402,690 B2 * | 3/2013 | Schneidmiller | A01M 1/103 | 43/121 |
| 8,475,783 B2 * | 7/2013 | Prohaska | A01N 59/04 | 424/84 |
| 8,635,807 B2 * | 1/2014 | Frisch | A01M 1/023 | 43/114 |
| 8,808,721 B2 * | 8/2014 | Banfield | A01M 1/026 | 424/406 |
| 8,904,701 B2 * | 12/2014 | Vasudeva | A01M 1/023 | 43/123 |
| 8,966,812 B2 * | 3/2015 | McKnight | A01M 1/023 | 43/123 |
| 9,192,165 B2 * | 11/2015 | Rose | A01M 1/023 | |
| 9,220,254 B2 * | 12/2015 | Dong | A01M 1/14 | |
| 9,386,763 B2 * | 7/2016 | Vasudeva | A01M 1/023 | |
| 10,091,980 B1 * | 10/2018 | Cogley | A01M 1/023 | |
| 10,098,337 B2 * | 10/2018 | Yans | A01M 1/14 | |
| 10,420,345 B2 * | 9/2019 | Clapsaddle | A01M 1/023 | |
| 2004/0025412 A1 * | 2/2004 | Simchoni | A01M 1/023 | 43/107 |
| 2006/0016120 A1 * | 1/2006 | Masters | A01M 1/023 | 43/114 |
| 2007/0256351 A1 * | 11/2007 | Milton | A01M 1/023 | 43/139 |
| 2011/0047860 A1 * | 3/2011 | Black | A01M 1/02 | 43/123 |
| 2011/0203159 A1 * | 8/2011 | McKnight | A01N 37/36 | 43/123 |
| 2012/0060407 A1 * | 3/2012 | Lindsey | A01M 1/2094 | 43/124 |
| 2012/0110894 A1 * | 5/2012 | Black | A01M 1/026 | 43/123 |
| 2012/0151823 A1 * | 6/2012 | Donoho | A01M 1/023 | 43/123 |
| 2012/0204477 A1 * | 8/2012 | Fairleigh | A01M 1/023 | 43/121 |
| 2012/0227312 A1 * | 9/2012 | Fairleigh | A01M 1/023 | 43/58 |
| 2012/0324780 A1 * | 12/2012 | James | A01M 1/026 | 43/107 |
| 2013/0047495 A1 * | 2/2013 | Frisch | A01M 1/10 | 43/114 |
| 2013/0125449 A1 * | 5/2013 | Winston | A01M 13/003 | 43/125 |
| 2013/0219771 A1 * | 8/2013 | Black | A01M 1/02 | 43/114 |
| 2014/0033597 A1 * | 2/2014 | Vasudeva | A01M 1/023 | 43/2 |
| 2014/0144328 A1 * | 5/2014 | Greene, Jr. | C12C 13/10 | 99/276 |
| 2015/0068105 A1 * | 3/2015 | Vasudeva | A01M 1/023 | 43/114 |
| 2016/0135629 A1 * | 5/2016 | Robertson | A47G 23/0216 | 220/739 |
| 2017/0006849 A1 * | 1/2017 | Frutos | A01N 37/34 | |
| 2017/0251655 A2 * | 9/2017 | Frutos | A01M 1/103 | |
| 2018/0000093 A1 * | 1/2018 | Nchekwube | A01M 1/02 | |
| 2018/0027794 A1 * | 2/2018 | Hortel | A01M 1/2011 | |
| 2018/0064088 A1 * | 3/2018 | Hauptmann | A01M 1/06 | |

* cited by examiner

BEDBUG TRAP WITH CARBON DIOXIDE GENERATOR

CLAIM OF PRIORITY

The present international application claims priority to U.S. patent application Ser. No. 15/594,931, entitled Bedbug Trap With Carbon Dioxide Generator, by Paul Stevens, filed May 15, 2017, herein incorporated by reference.

BACKGROUND OF THE INVENTION

1. Field of the Invention

This invention relates to bedbug traps and particularly to bedbug traps with carbon dioxide generators.

2. Description of the Prior Art

Bedbugs are an age old problem. Recently, there has been a resurgence of the pest. Bedbugs are notoriously difficult to get rid of because they populate many hidden areas within a room and within clothing and bedding. The only practical way to get rid of bedbugs is to lure them to a trap and then trap them. To that end, numerous bedbug traps have been invented recently. Some examples of such traps are found in U.S. Pat. Nos. 8,808,721; 8,904,701; 8,966,812; 9,220,254; and 9,386,763. All of these devices utilize the fact that bedbugs are attracted to humans (or other warm blooded animals) for food. This attraction involves, heat, carbon dioxide and, sometimes, lactic acid. All humans produce these by-products of life. All of the patents above use heat and carbon dioxide and, as noted, some include lactic acid. The differences between them is how they do that. Most generate carbon dioxide by using carbon dioxide canisters, such as those used in paint ball and other air guns. Heat is generated in a number of ways, such as using a lamp or small electric heater. The main problem with all of them is that they tend to be designed to be hidden. One patent refers to a stigma of having a bedbug infestation and by using a discreet device there will be no embarrassment of having a bedbug infestation. They are designed for the gradual elimination of bedbugs, even while people are living in the infested room. This, of course, is problematic because a small device can only generate limited signals. Moreover, use of one-time use canisters to generate carbon dioxide is expensive and requires frequent changing of the canisters. Finally, using such a device while a user continues to inhabit the room is almost self-defeating because, even if the trap is present, the bedbugs will also be attracted to the people.

BRIEF DESCRIPTION OF THE INVENTION

The instant invention eliminates these problems. It is a large container system that generates carbon dioxide using inexpensive materials that can be easily replaced. Moreover, it is large enough to generate a larger heat signature, which helps to attract more bedbugs. And finally, it is designed to be used in an empty room. People are not supposed to be in the room while it is in operation to allow it to attract and trap as many of the bedbugs as possible in as short a time as possible.

The device uses a set of stacked containers. The top container holds a quantity of water, sugar and yeast, which is allowed to ferment, thus generating carbon dioxide. The central container holds a small heating pad. The pad not only generates heat to attract the bedbugs, it also heats the water and yeast mixture to aid in the fermentation. A hose with a water trap system brings the generated carbon dioxide from the upper chamber to the bottom chamber. This central chamber sits in a container that has a rough exterior and a smooth interior. The user can place diatomaceous earth to aid in their demise in the lowest bowl if desired. Holes, formed around the base of the bottom chamber allow the carbon dioxide to escape into the room, which attracts the bedbugs. The fermentation process also produces the carbon dioxide in a series of "burps", which also aids in the simulation of breathing. The assembled unit is large and is designed to have a significant impact in a room, thus ensuring the likelihood of trapping as many bedbugs as possible in the shortest amount of time. Finally, the water, sugar and yeast are common household items that are easily and cheaply replenished as needed.

Although not preferred, the unit can be made smaller so that travelers can use one in a hotel room, for example.

DETAILED DESCRIPTION OF THE INVENTION

Figure 1:
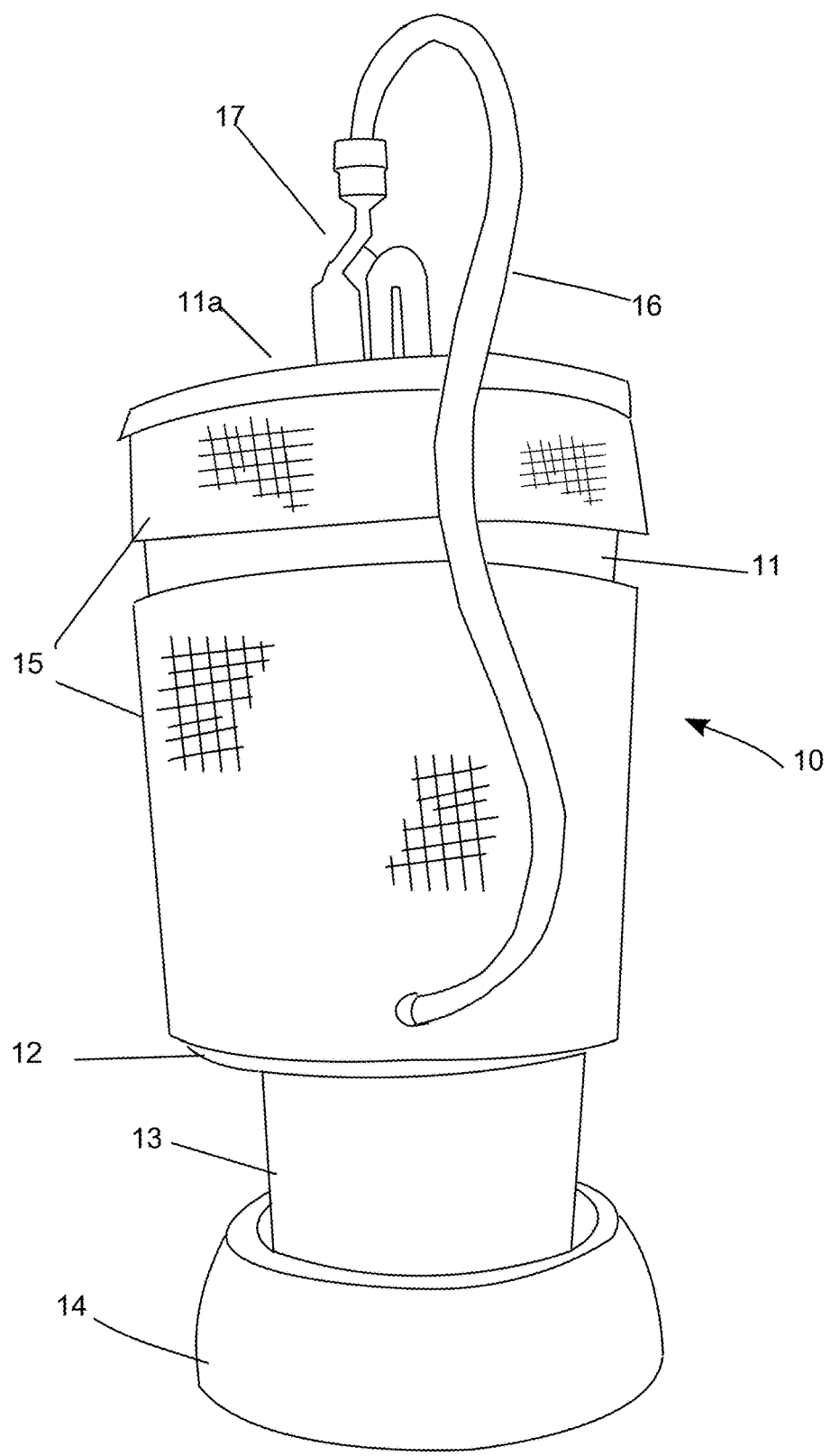
FIG. 1 is a perspective view of an assembled bedbug trap.
Figure 2:
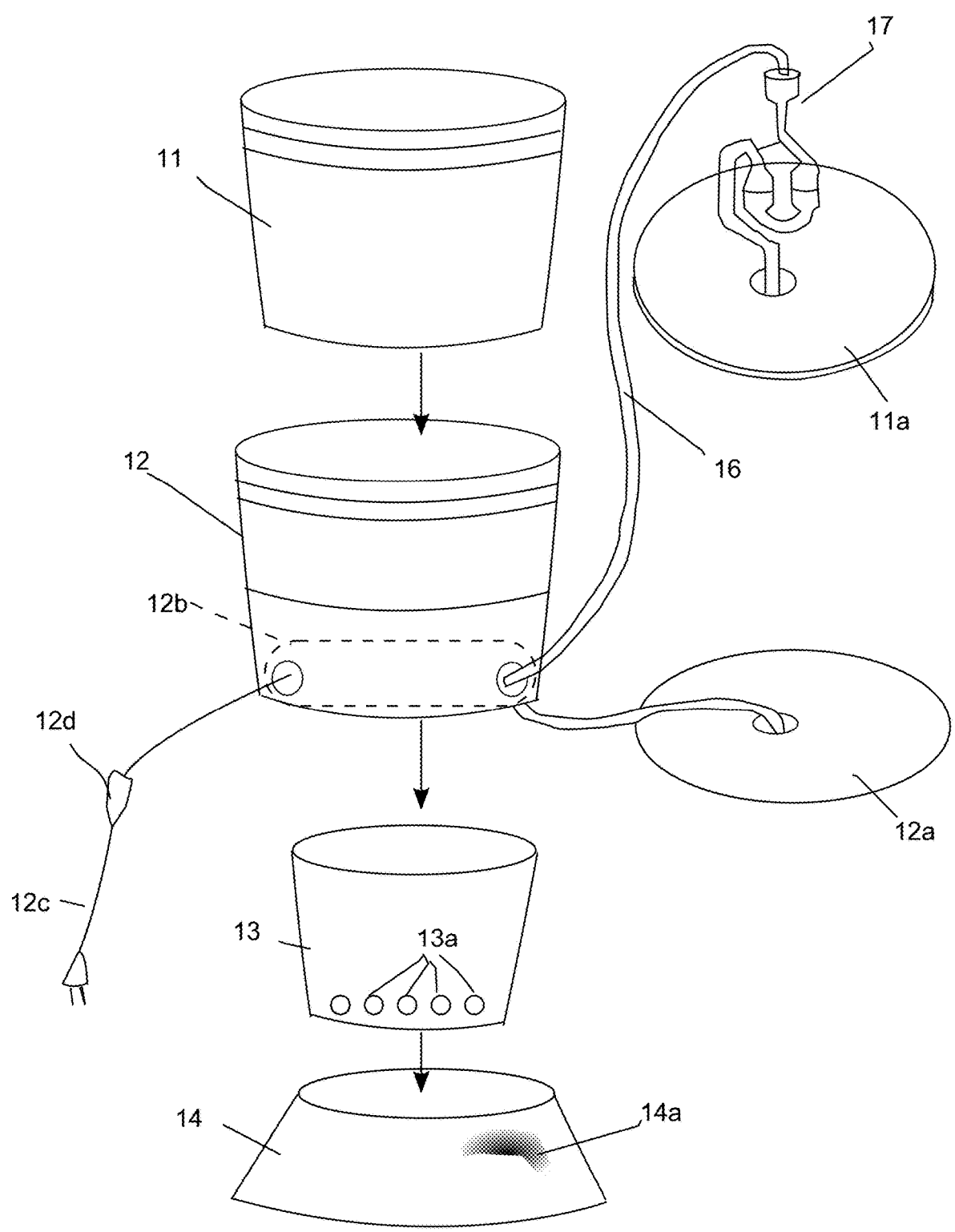
FIG. 2 is an exploded view of the bedbug trap showing the major components thereof.

Referring now to the drawings and particularly, FIGS. 1 and 2, the bedbug trap 10 is shown. The trap 10 has a number of stacked and nested containers as shown in FIG. 1. FIG. 2 shows these containers in an exploded view. The uppermost container 11 is a large hollow vessel that has a removable top or lid 11a. As discussed below, the sugar, water and yeast mixture is held in this container. This container is placed into the middle container 12. Note the bottom 12a of the middle container 12 This container is also a hollow vessel. A heating pad 12b is stored in the bottom of this container as shown. Note the power cord 12c of the heating pad 12b and the switch 12d. The upper container 11 is designed to fit on the top of the heating pad 12b, which enables heat to heat the sugar, water and yeast mixture is held in upper container 11.

As discussed above, the upper container 11 has a top 11a. This top is fit onto the top of the upper container as shown in FIG. 1. Note the insulation 15 placed around the upper container and the middle container. A tube 16 is used to carry the carbon dioxide ($CO_2$), which is produced in the upper container, to the lower container 13. The hose 16 has an airlock attachment 17 attached as shown. The airlock 17 is filled with water. This causes the $CO_2$ to pulse through the airlock. This pulsation simulates natural breathing. As shown, the hose 16 carries the $CO_2$ to the bottom 12a of the middle container and it exits through the center of the bottom 12a as shown. In this way, the hose 16 injects the $CO_2$ into the lower container 13. Note that the lower container 13 has a series of holes 13a formed in the lower portion of the lower container as shown. The $CO_2$ from the upper container escapes into a room through these holes. As noted, the airlock provides pulsed supply of $CO_2$ which, when combined with the heat generated by the heating pad 12b, attracts bedbugs. Note that the position of the heating pad also allows it to heat the lower container as well.

At the base of the bedbug trap 10 is the holding container 14. As shown, the lower container 13 fits into the holding container. The outer surface of the lower container 14a has a rough surface (note the rough surface covers the entire outer surface of the container) that allows the bedbugs to climb into the holding container. The inside surface of the holding container should be smooth, ensuring that the bedbugs, once in the container 14 will be trapped. It is possible to add some powdered insecticide, such as diatomaceous earth, to kill the bedbugs quickly. In use, bedbugs are found in both the holding container 14 and in the lower container 13.

After the device has been assembled, sugar/yeast/water mixture has been added and the heating pad is turned on, the operation of the device is automatic. Once the sugar/yeast/water mixture starts to release $CO_2$ the bedbugs are attracted to it. Overtime, one simply has to replenish the sugar/yeast/water mixture and to clean out the holding and lower containers.

Figure 3:
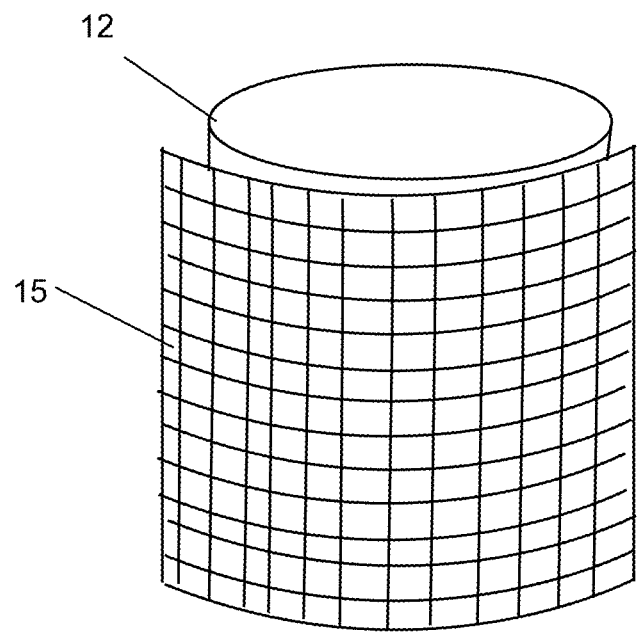
FIG. 3 is a detail view of the middle container showing an insulation wrap therefor.

FIG. 3 is a detail view of the middle container showing an insulation wrap 15 therefor. As noted above, and as shown in FIG. 1, the middle container 12 and a portion of the upper container are wrapped with insulation 15 to concentrate the heat from the heating pad and to present a heat signature towards the lower container, in concert with the emission of the $CO_2$.

Figure 4:
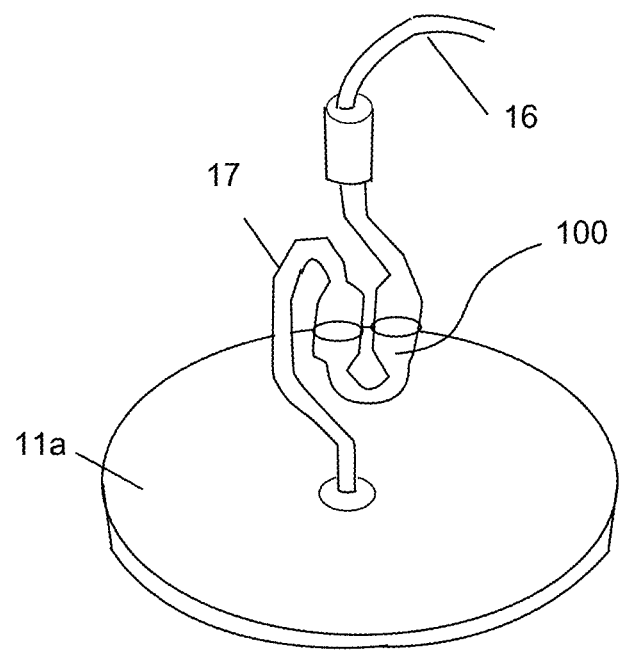
FIG. 4 is a top perspective view of the preferred water trap for the bedbug trap system.

FIG. 4 is a top perspective view of the preferred water trap for the bedbug trap system. As noted above, a brewing S-type airlock 17 is preferably used to pulse the $CO_2$ from the upper container out to the lower container. Note that the water 100 trapped in the airlock also acts to contain any odor emitted from the upper container.

Figure 5:
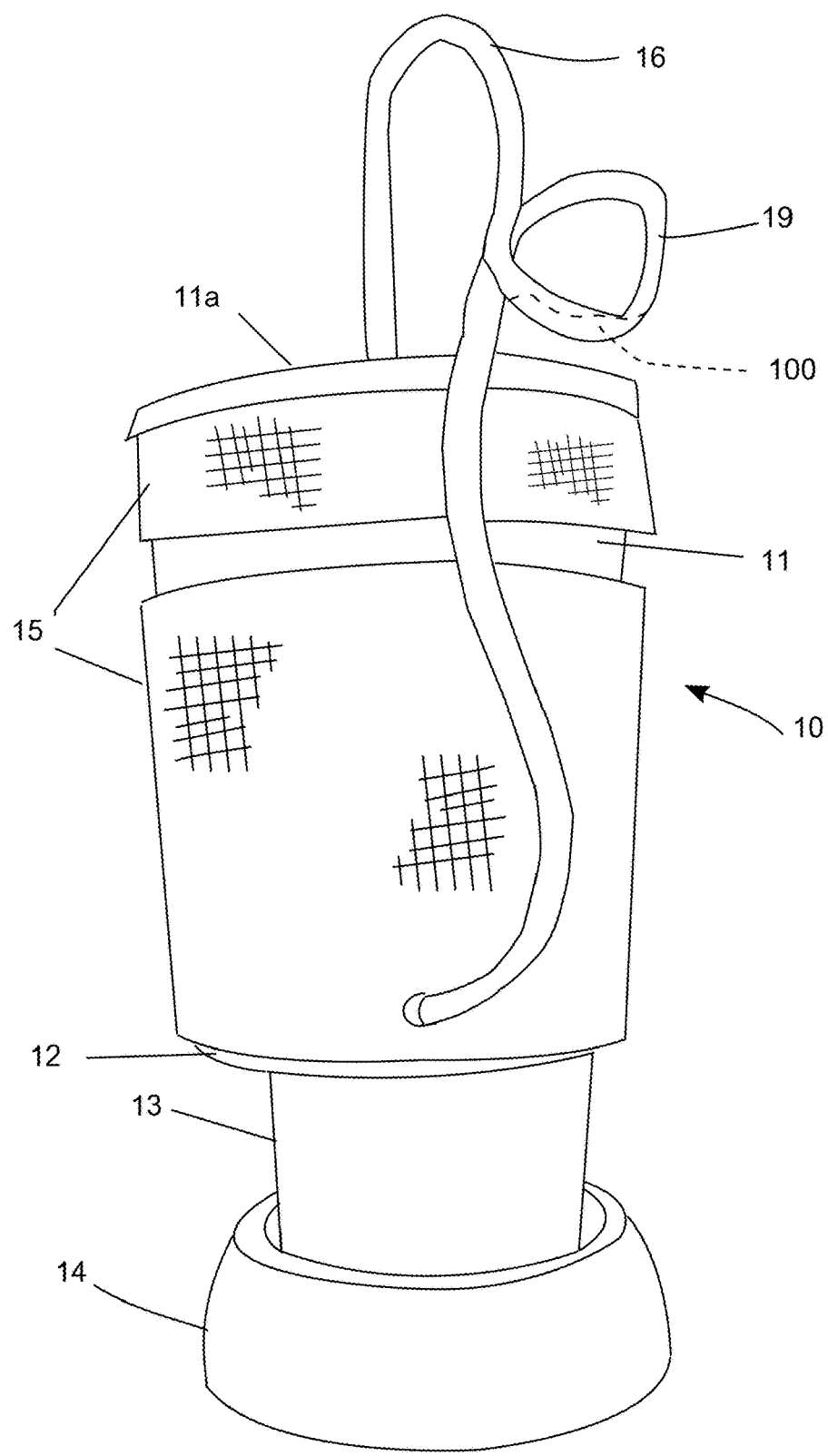
FIG. 5 is a perspective view of an assembled bedbug trap showing an alternative water trap system.

FIG. 5 is a perspective view of an assembled bedbug trap showing an alternative water trap system. The device also works by making a loop 19 in hose 16 and adding a small amount of water 100, that is trapped in the loop 19. This allows the $CO_2$ to escape and still provides a pulsating delivery of the gas. Although this alternative works, it is not preferred.

Figure 6:
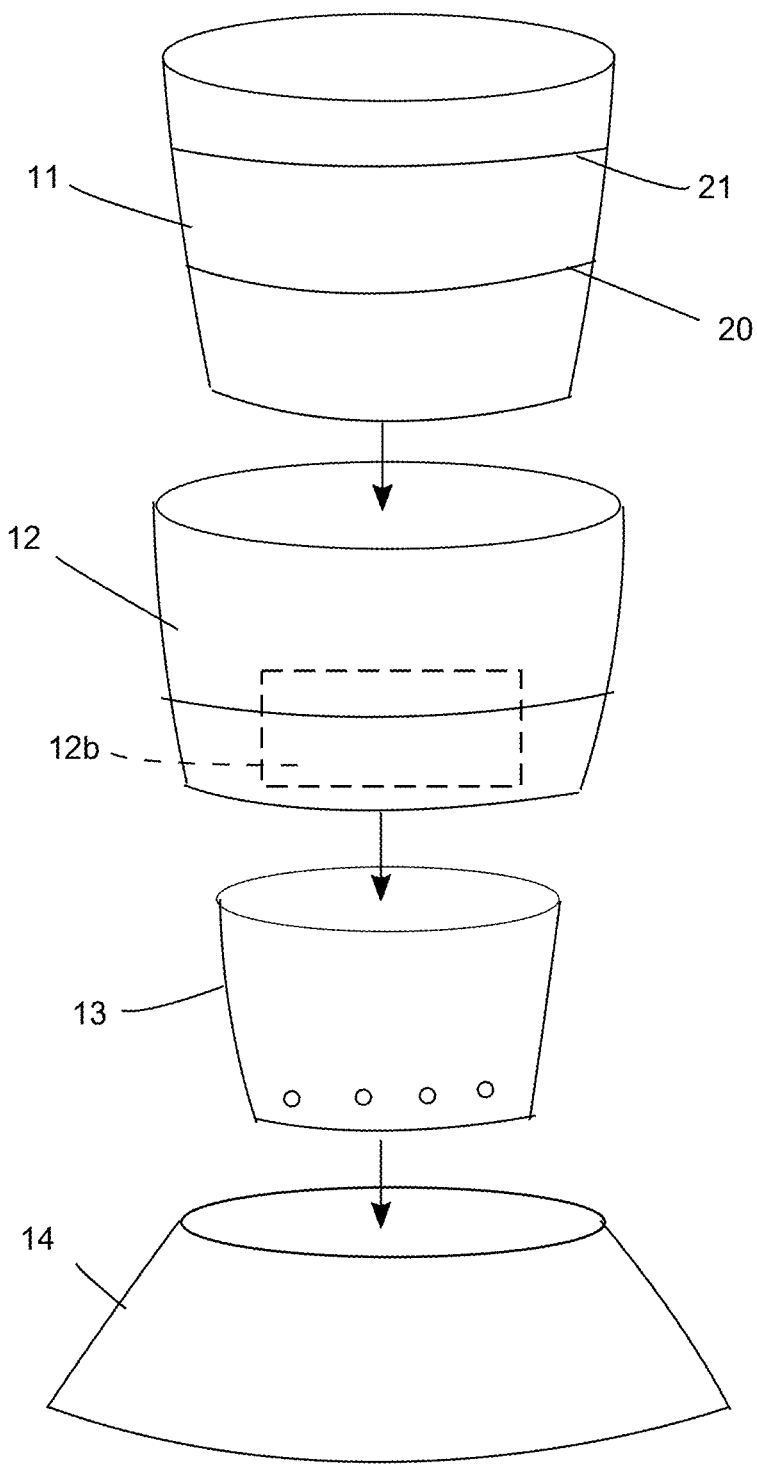
FIG. 6 is a side exploded schematic view of the major elements of the bedbug trap showing assembly and operation of the trap.

FIG. 6 is a side exploded schematic view of the major elements of the bedbug trap showing assembly and operation of the trap. This figure does not show all of the elements used in the trap. However, it does provide a guide for the assembly of the trap.

To assemble the trap, the following steps are needed. First, mix a desired amount of water, sugar and yeast. As shown in the figure, the upper container 11 has two marks on it. One of a one-gallon mark 20 and the second is a two-gallon mark 21. More water and yeast yields more $CO_2$. In the preferred embodiment, two gallons of water at 100° F. mixed with 6 cups of sugar and 3 tablespoons of yeast are used. It is important to measure the levels accurately and to monitor the temperature. When the water reaches 100° F., put the lid 11a with the airlock 17 in place (and filled according to the marks on the airlock) on the upper container. The temperature of the water should be between about 105 and 107 degrees F. to produce optimum levels of $CO_2$. However, a temperature above 111 degrees F. will kill the yeast and stop $CO_2$ production.

Next, attach the hose 16 to the airlock and place the upper container into the middle container 12. As this point, the heating pad 12b is turned on. Note that the hose 16 is already installed in the middle container and runs out the bottom of the middle container as shown in FIG. 2.

Next, the lower container 13 is placed in the holding container 14. Note that, if desired, a quantity of diatomaceous earth can be added to the holding container. Then the upper and middle container are placed on the lower container 13, ensuring that the hose 16 extends down into the lower container 13. The trap is now assembled and ready for operation.

Bedbugs are attracted to the device and will climb the outer surface of the holding container 14. Once inside, the slick surface keeps them within the holding container. Bedbugs may also enter the lower container as well. All trapped bedbugs can be disposed of and the trap parts cleaned and reset. In this way, bedbugs can be conveniently and assuredly trapped and destroyed.

In the preferred embodiment, the containers are large (up to five gallons for the top container). However, the device may be made in any size. For example a small travel unit with a top container of the quart size can be used, if desired, in a hotel room, for example.

Although not as effective as the larger units, it can help and, if nothing else, can provide peace of mind.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A bedbug trap comprising:
   a) an upper container comprising a carbon dioxide generator, said upper container comprising a bottom surface and sidewall, and a top, said top comprising an aperture with a hose providing fluid communication from an interior of said upper container;
   b) a middle container receiving at least a lower portion of said upper container, said middle container comprising a heat source positioned below said upper container within said middle container;
   c) a lower container comprising a lower container sidewall and a plurality of holes formed around a lower perimeter of said lower container sidewall, said lower container set below said middle container, supporting said middle container; and
   d) a holding container set below said lower container and receiving at least a lower portion of said lower container, said holding container comprising a bowl for receiving said lower container, a rough outer surface and a smooth inner surface;
   e) whereby said upper container is placed in said middle container and said middle container is placed on top of said lower container and further wherein said lower container is placed within said holding container exposing the plurality of holes to a space set between said lower container and the smooth inner surface of said holding container; and
   wherein said hose is positioned to provide the fluid communication from the interior of said upper container to said lower container.

2. The bedbug trap of claim 1 wherein said hose comprises an airlock.

3. The bedbug trap of claim 2 wherein said airlock comprises a brewing S-type airlock.

4. The bedbug trap of claim 2 wherein said airlock comprises a loop formed in said hose and further wherein said loop contains a quantity of water therein.

5. The bedbug trap of claim 1 wherein the carbon dioxide generator is in said upper container, and said heat source provides heat energy to sustain the carbon dioxide generator.

6. The bedbug trap of claim 1 wherein said carbon dioxide generator comprises a mixture of a quantity of warm water, sugar and yeast.

7. The bedbug trap of claim 6 wherein said quantity of warm water is brought to a temperature of 100° F.

8. The bedbug trap of claim 6 wherein said quantity of warm water is brought to a temperature of between about 105° and 107° F.

9. The bedbug trap of claim 1 wherein said heat source is an electric heating pad.

10. The bedbug trap of claim 1 wherein said holding container has a quantity of a powdered insecticide therein.

11. The bedbug trap of claim 10 wherein the powdered insecticide is diatomaceous earth.

12. The bedbug trap of claim 1 wherein said upper and middle containers are wrapped in insulation batting.

13. The bedbug trap of claim 1 wherein said middle container comprises a middle sidewall with an aperture for receiving at least a portion of said hose.

14. The bedbug trap of claim 13 wherein said middle container comprises a removable bottom, said removable bottom comprising an aperture for receiving at least a second portion of said hose.

15. The bedbug trap of claim 14 wherein said hose provides the fluid communication between the interior of said upper container and said lower container.

16. The bedbug trap of claim 13 wherein said hose passes under said heat source.

17. The bedbug trap of claim 1 wherein said hose provides the fluid communication between the interior of said upper container and said lower container.

\* \* \* \* \*